United States Patent [19]

Haloburdo, Jr. et al.

[11] 4,440,508

[45] Apr. 3, 1984

[54] DETECTOR-TRANSDUCER FOR SENSING TEMPERATURES IN AN ENGINE

[75] Inventors: Joseph J. Haloburdo, Jr., Bolton; Rocco M. Tommasini, West Hartford, both of Conn.

[73] Assignee: United Technologies Corporation, Hartford, Conn.

[21] Appl. No.: 367,147

[22] Filed: Apr. 9, 1982

[51] Int. Cl.³ .............................................. G01K 7/14
[52] U.S. Cl. ...................................... 374/144; 374/179
[58] Field of Search ............... 374/144, 172, 179, 180, 374/181, 166

[56] References Cited

U.S. PATENT DOCUMENTS

| | | | |
|---|---|---|---|
| 2,072,312 | 3/1937 | Obermaier | 374/144 |
| 2,463,566 | 3/1949 | Saldin | 374/144 |
| 2,573,596 | 10/1951 | Offner | 374/144 |
| 2,798,377 | 7/1957 | Brownlee | 374/166 |
| 3,307,402 | 3/1967 | Richardson | 374/144 |
| 3,582,761 | 6/1971 | Hall | 374/172 |

*Primary Examiner*—S. Clement Swisher
*Attorney, Agent, or Firm*—Gene D. Fleischhauer

[57] ABSTRACT

A detector-transducer 26 for sensing temperatures in an engine is disclosed. A temperature signal generated by a temperature sensing device 28 is biased by a supplementary thermocouple 30. A resistor 52 is in series with the temperature sensing device. The supplementary thermocouple is in parallel with the resistor 52. In one embodiment the temperature sensing device is the junction of a second thermocouple.

11 Claims, 4 Drawing Figures

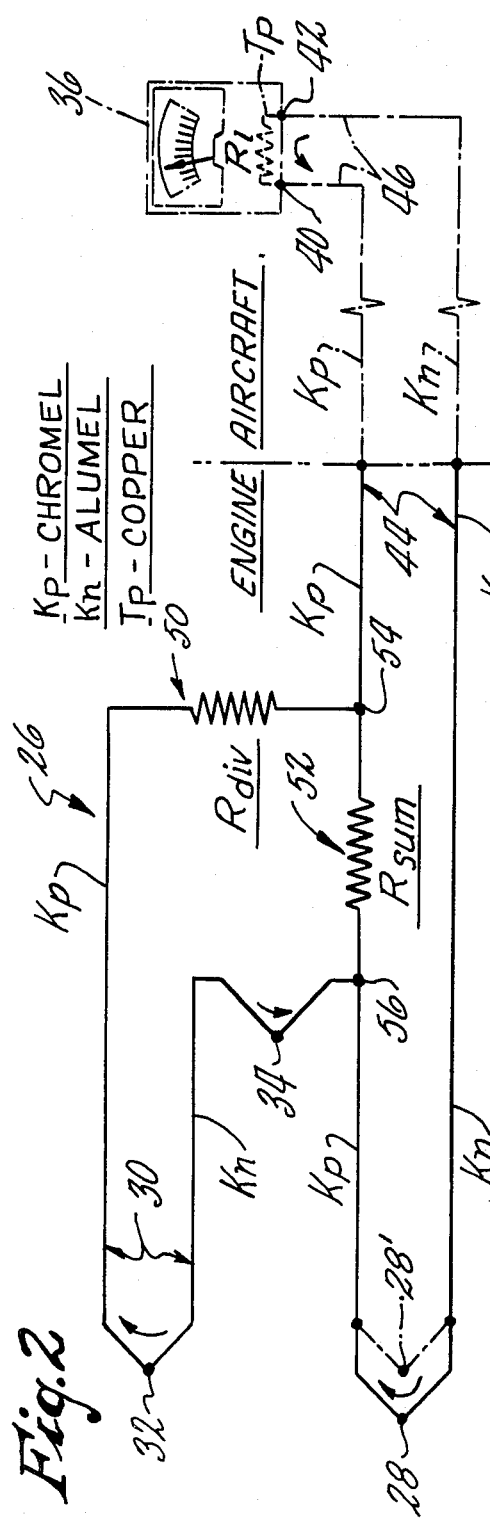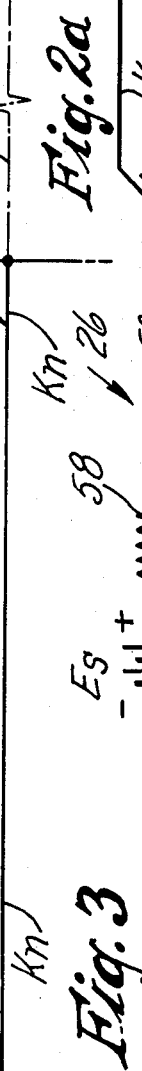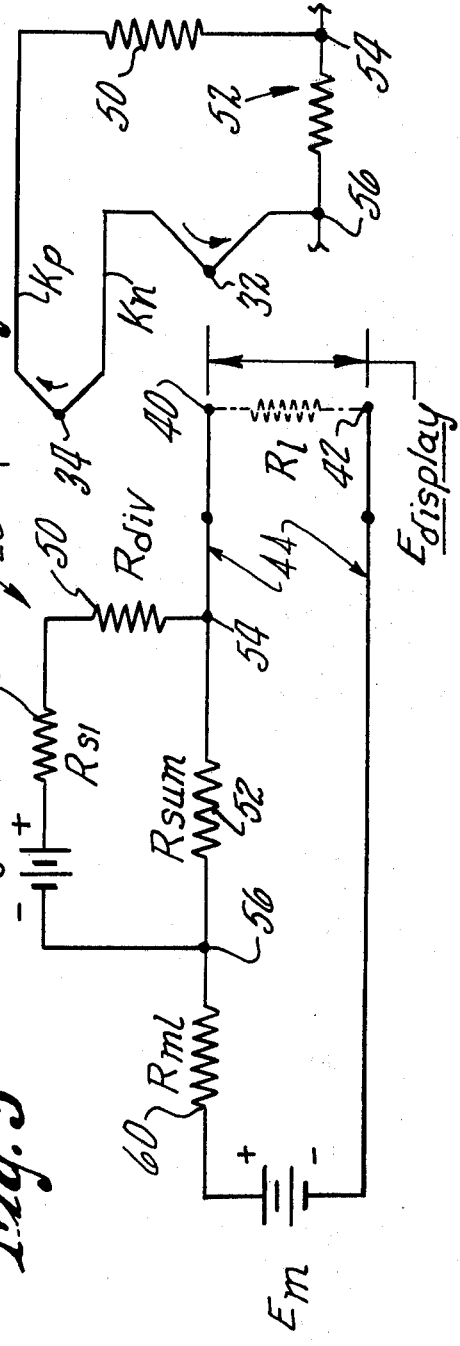

DETECTOR-TRANSDUCER FOR SENSING TEMPERATURES IN AN ENGINE

DESCRIPTION

Field of Invention

This invention relates to the sensing of temperature in an engine and more particularly to an apparatus for sensing such temperatures and providing a biasing signal to the sensed temperature. This invention was developed for application to an axial flow gas turbine engine of the type installed in an aircraft and is thought to be suitable for use in engines of other types.

Background Art

An engine such as an axial flow gas turbine engine includes a compression section, a combustion section and a turbine section. A flow path for a working medium fluid such as air extends through the engine. As the gases are flowed through the engine, the working medium gases are compressed in the compression section to raise the temperature and pressure of the gases. The compressed gases are burned with fuel in the combustion section to form high temperature, high pressure working medium gases. The high temperature, high pressure gases are expanded through the turbine section to produce useful work and thrust.

Components of the engine which are in close proximity to the working medium flow path or which extend across the working medium flow path are heated to temperatures as high as two thousand degrees Fahrenheit by the gases. Exceeding the critical temperature of these components may cause severe wear and even failure of the components. Accordingly, a critical temperature limit is placed on the temperature of the working medium gases to avoid such wear.

The exhaust region of the engine is one location in the engine where the temperature of the gases is indicative of the maximum temperature of the gases in other locations of the engine. The temperature of the working medium gases is monitored in the exhaust region to ensure that the maximum temperature of the gases does not exceed a critical high temperature limit for engine components. One device for monitoring such a temperature is a thermocouple. The thermocouple generates an electromotive force which is proportional to the temperatures of the junctions of the thermocouple and thus the temperature of the environment in which the thermocouple is disposed. An indicator, such as a voltage sensitive device or a current sensitive device in electrical communication with the thermocouple, provides a visible display of the temperature. The indicator shows whether the temperature is within an acceptable or unacceptable range and is typically mounted in the control panel of the aircraft where it is visible to aircraft personnel.

Aircraft engines may be modified sometime after installation in the aircraft to increase the performance of the engine. These modifications often affect the critical temperature limit of the engine, causing the limit to either rise or fall, which requires a replacement of the indicator or a modification of the unacceptable or acceptable range of the indicator. However, alteration or replacement of the indicator or other components of the aircraft is not always an acceptable solution. Often in such situations, the aircraft, which is the source of electrical power for the engine is not available for modification to provide additional electrical power for biasing the temperature sensing apparatus. Accordingly, scientists and engineers are seeking to develop a temperature sensing system which is easily altered after an engine modification to enable an unchanged indicator to show whether an engine temperature is within critical limits and which, after alteration, does not require the use of additional power from the aircraft.

Disclosure of Invention

According to the present invention, fluids at different temperatures in an engine and a supplementary thermocouple system provide a biasing electromotive force to the electrical output of a device for sensing temperature in the engine.

In accordance with one embodiment of the present invention, the temperature sensing device is the junction of a second thermocouple disposed in close proximity to a junction of the supplementary thermocouple such that the biasing electromotive force is proportional to the temperature sensed by the temperature sensing device.

A primary feature of the present invention is an engine having working medium fluids flowing at different temperatures which through the engine. Another feature is a detector-transducer for sensing temperature mounted on the engine. The detector-transducer includes a temperature sensing device in series with a summing resistor. A supplementary thermocouple is connected in parallel across the summing resistor. The thermocouple is in heat transfer communication with the fluids. In one embodiment, the supplementary thermocouple and a resistor in series with the supplementary thermocouple are connected in parallel across the summing resistor. In one embodiment, the temperature sensing device is a junction of a second thermocouple disposed in close proximity to the hot junction of the supplementary thermocouple at a high temperature location of the engine. In another embodiment: the difference in temperature between the hot junction and the reference junction is approximately ten times greater than the deviation in temperature of the reference junction from the average temperature of the reference junction; and, the resistor in series with the supplementary thermocouple has a resistance which is at least ten times greater than the resistance of the summing resistor.

In one embodiment, the detector-transducer and an indicator means form a temperature measuring system. The indicator means has an input impedance. In one embodiment the detector-transducer has a combined output impedance which is substantially equal to the input impedance of the indicator to maximize the transfer of power between the detector transducer and the indicator means. In another embodiment, the input impedance of the indicator means is many thousands of times greater than the output impedance of the detector-transducer.

A principal advantage of the present invention is an engine mounted detector-transducer for sensing temperature that avoids connections to external power sources while providing a biased temperature signal from the engine by using the thermal energy of the engine to develop a biasing electromotive force. Another advantage is the insensitivity of the detector-transducer to engine vibrations. Still another advantage is the simplicity and ease of providing a biasing electromotive force to an engine after a modification of other components of the engine.

The foregoing features and advantages of the present invention will become more apparent in the light of the following detailed description of the best mode for carrying out the invention and in the accompanying drawing.

BRIEF DESCRIPTION OF DRAWINGS

FIG. 2 is a schematic illustration of a temperature measuring system of a gas turbine engine which includes a detector-transducer having a supplementary thermocouple system for providing a biasing voltage to the temperature sensing systems.

FIG. 2a is a schematic illustration of an alternate embodiment of the supplementary thermocouple system of FIG. 2.

FIG. 3 is a diagrammatic electrical illustration corresponding to the schematic illustration of FIG. 2.

BEST MODE FOR CARRYING OUT THE INVENTION

Figure 1:
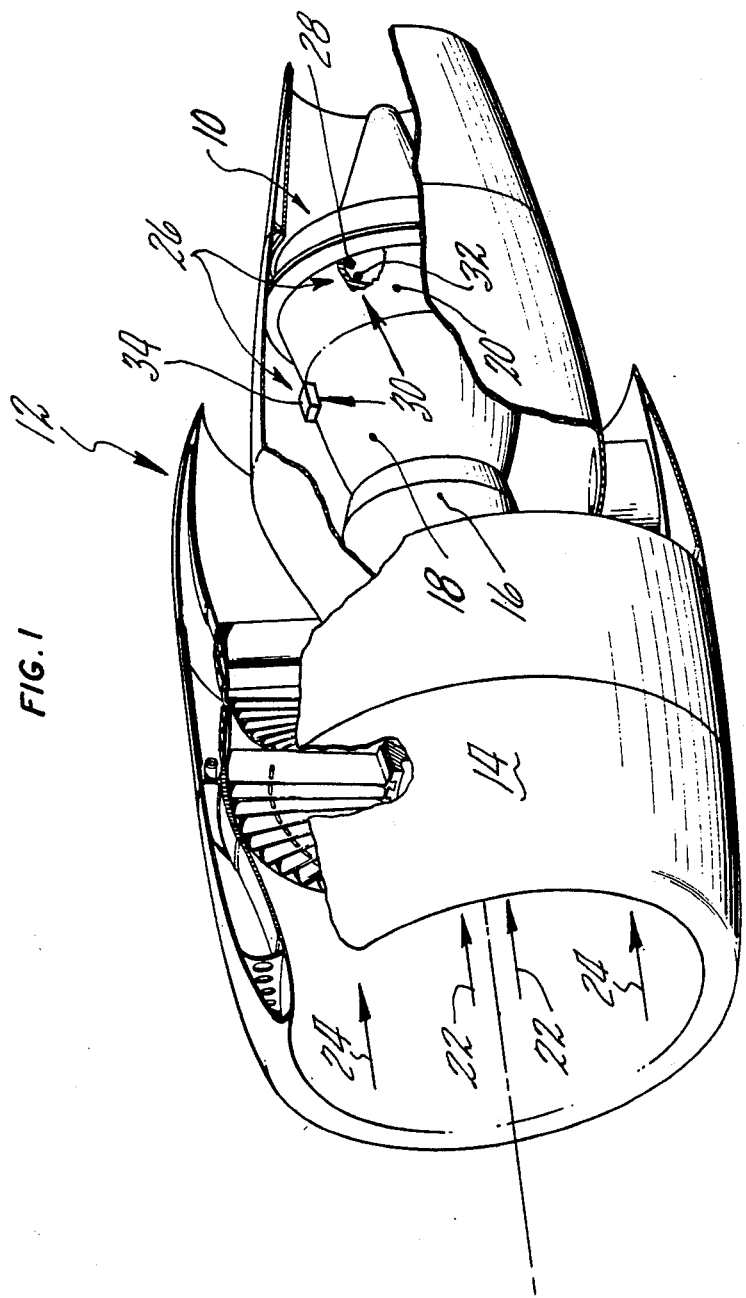
FIG. 1 is partial perspective view of an axial flow gas turbine engine mounted in an aircraft nacelle with portions of the nacelle and the engine broken away to show the exhaust region of the engine.

A gas turbine engine 10 of the axial flow, turbofan type is shown in FIG. 1. A nacelle 12 circumscribes the engine and is adapted to both support and position the engine from a support structure such as an aircraft wing (not shown). The engine is formed of a fan section 14, a compressor section 16, a combustion section 18 and a turbine section 20. A primary flow path 22 for working medium fluids such as working medium gases extends rearwardly through these sections. A secondary flow path 24 for working medium gases is outwardly of the primary flow path. A portion of the turbine section 20 is broken away to show the interior of the exhaust gas duct of the turbine section of the engine. A detector-transducer 26 for sensing a temperature in a gas turbine engine is mounted on the engine. The detector-transducer includes a means for detecting temperature and transducing the temperature into a first electromotive force. In the embodiment shown, the means is a first junction 28 formed of two unlike metals. The detector-transducer includes a supplementary thermocouple 30. The supplementary thermocouple has a first (hot) junction 32 in close proximity to the first junction 28 and has a second (reference) junction 34 at a second location of the engine. These junctions are exaggerated in size for purposes of illustration. The first junction 28 and the first junction 32 are placed in heat transfer communication with the hot working medium gases flowed through the engine. The second junction 34 is placed in heat transfer communication with gases flowed through the engine at a second temperature which is less than the first temperature. The first junction 28, the first junction 32 and the second junction 34 need not be in direct contact with the working medium gases to be in heat transfer communication with the gases. For example, a junction of a thermocouple that was disposed in a cavity surrounded by metal which was in heat transfer communication with the working medium gases would be a junction in heat transfer communication through the metal with the working medium gases.

FIG. 2 is a schematic illustration of the detector-transducer 26. The first junction 28 is formed of two unlike metal wires joined together: Chromel® wire Kp; and Alumel® wire Kn. An indicator means 36 for indicating electromotive force places the wires in electrical communication through a copper resistor 38 having a resistance $R_1$. The indicator means has an input impedance $I_i$. The resistor 38 provides two additional junctions 40 and 42 which are at identical temperature by reason of their location in the control panel of the aircraft cockpit. The effect of the two junctions 40, 42 at the same temperature is to form a second Chromel®-Alumel® thermocouple 44 having a first junction 28 and a second junction 46. As will be realized, additional first junctions 28' may be placed in parallel with the first junction 28 and disposed in proximity to the first junction 28 to provide a means for averaging the temperature in the region of the first junction 28 or along circumferentially spaced or axially spaced locations in the working medium flow path. A first resistor, such as the division resistor 50 having a resistance $R_{div}$, and a second resistor, such as the summing resistor 52 having a resistance $R_{sum}$, are joined at a connection 54. The second resistor 52, the second junction 34 of the supplementary thermocouple 30, and the first junction 28 of the measuring thermocouple 44 are joined at a connection 56. The first junction 28 of thermocouple 44 is joined through the Alumel® thermocouple wire to junction 42 and through the Chromel® thermocouple wire and the second resistor 52 to the junction 40.

In summary, the second resistor 52 is in series with the measuring thermocouple 44; the supplementary thermocouple 30 and the first resistor 50 are in series with each other and are connected across the connections 54 and 56 in parallel with the second resistor 52. The first junction 32 of the supplementary thermocouple is between the first resistor 50 and the second resistor 52; the second junction 34 of the supplementary thermocouple is between the first junction 32 and the second resistor 52.

FIG. 2a is an alternate embodiment of FIG. 2 having the junctions 32, 34 of the supplementary thermocouple each replaced with the other in the circuit to reverse the polarity of the electromotive force generated by the thermocouple and thus to reverse the effect of the biasing electromotive force. In this embodiment, the second junction 34 of the supplementary thermocouple is between the first resistor 50 and the second resistor 52; the first junction 32 is between the second junction 34 and the second resistor 52.

FIG. 3 is a diagrammatic electrical equivalent of FIG. 2 replacing the thermocouple wires with equivalent resistances and showing the thermocouples as sources of electrical power. A third resistor 58 has a resistance $R_{sl}$ which is equal to the resistance of the lead wires of the supplementary thermocouple. The Alumel® and Chromel® lead wires extend in parallel across the second resistor 52 between connections 54 and 56. A fourth resistor 60 has a resistance $R_{ml}$. The resistance $R_{ml}$ is equal to the resistance of the lead wires of the measuring thermocouple 44. In one embodiment found to be satisfactory, the resistance of resistor 50 and 58 together was approximately twenty ohms ($R_{sl} + R_{div} = 20\ \Omega$), the resistance of the resistor 52 was approximately one ohm ($R_{sum} = 1\Omega$) and the resistance of resistor 60 was approximately one ohm ($R_{ml} = 1\Omega$).

During operation of the gas turbine engine, hot working medium gases are exhausted through the turbine section 20. These gases are in heat transfer communication with the first junction 28 of the measuring thermocouple 44. The first junction quickly reaches a temperature $T_{mhj}$. The electromotive force developed by the first junction 28 is equal to the quantity resulting from multiplying the Seebeck coefficient by the temperature of the junction ($E_{mhj} = K_s \cdot T_{mhj}$). The second (reference) junction 46 of the measuring thermocouple is located in the aircraft and is at a much lower temperature $T_{mrj}$ than the first junction 28. The electromotive force developed by the reference junction is equal to the quantity resulting from multiplying the Seebeck coefficient by the temperature of the reference junction ($E_{mrj} = -K_s \cdot T_{mrj}$). The electromotive force $E_m$ developed by the measuring thermocouple under operative conditions is equal to the difference between the electromotive forces of the junctions ($E_m = K_s \cdot [T_{mhj} - T_{mrj}]$).

The hot working medium gases are also in heat transfer communication with the first junction 32 of the supplementary thermocouple 30. The first junction quickly reaches a temperature $T_{shj}$ which is equal to the temperature $T_{mhj}$ experienced by first junction 28 of the measuring thermocouple 44 by reason of the close proximity of the first junction 32 to the first junction 28. The electromotive force developed by the first junction 32 is equal to the quantity resulting from multiplying the Seebeck coefficient by the temperature of the junction ($E_{shj} = K_s \cdot T_{shj}$). The second junction 34 of the supplementary thermocouple is at a location remote from the hot working medium gases, receives less heat than does the first junction 32, and reaches a lower temperature $T_{srj}$ than does the first junction 32. The electromotive force developed by the reference junction is equal to the quantity resulting from multiplying the Seebeck coefficient by the temperature of the reference junction ($E_{srj} = K_s \cdot T_{srj}$). The electromotive force $E_s$ developed by the supplementary thermocouple under operative conditions is equal to the difference between the electromotive forces of the junctions 32, 34 ($E_s = K_s \cdot [T_{shj} - T_{srj}]$).

The electromotive force Es of the supplementary thermocouple 30 is added to the electromotive force of measuring thermocouple 44 through the resistances $R_{sl}$, $R_{div}$ and $R_{sum}$ biasing upwardly the electromotive force which is developed by the measuring thermocouple 44. The resultant sum of the two electromotive force $E_{display}$ is sensed by the indicator means and the displayed temperature is biased upwardly. Because the first junction 32 of the supplementary thermocouple is in close proximity to the first junction 28 of the measuring thermocouple, the supplementary electromotive force $E_s$ is proportional to the electromotive force of the measuring thermocouple. Thus the modification of the sensed temperature is directly proportional to the sensed temperature and the displayed temperature is directly proportional to the actual temperature. As will be realized, the first junction 32 of the supplementary thermocouple might be located in a location of the engine having a constant temperature to provide a constant biasing electromotive force to the measuring thermocouple.

The contribution of the supplementary thermocouple to the electromotive force $E_{display}$ is given by the equation $K_s \cdot (T_{shj} - T_{srj}) \cdot / R_{sum}(R_{sum} + R_{div} + R_{sl}))$ where $R_1$ approaches a very large number such as one megohm. For the embodiment discussed above the contribution of the supplementary thermocouple to the electromotive force $E_{display}$ is approximately five percent. The temperature $T_{srj}$ of junction 34 varies in temperature by approximately seventy-five degrees Fahrenheit (75° F.) from the average temperature of the reference junction. The difference in temperature between the average temperature of the second junction and the temperature of the first junction is at least one-thousand degrees Fahrenheit (1000° F.). The difference in temperature between the first junction 32 of the supplementary thermocouple and the second junction 34 is approximately ten times greater than the variation in temperature of the locations of the junctions of the supplementary thermocouple. Because only five percent of the electromotive force of the supplementary thermocouple is added to the electromotive force of measuring thermocouple 44, and because the variation in junction temperatures due to changes in ambient conditions is small compared to the temperature difference between the junctions, the error introduced by such variations is less than one percent of the electromotive force sensed by the indicator under the most severe changes in ambient operating conditions. Thus, the selection of the locations for the supplementary thermocouple and the selection of resistances ensures an accurate response by the indicator means 36 after inclusion of the biasing supplementary the thermocouple in the detector-transducer 26.

The indicator means 36 installed in the aircraft may be either a current sensitive, low resistance indicator or a voltage sensitive, high resistance indicator. The output impedance of the detector-transducer is matched to the input impedance of the indicator means which is current sensitive to ensure a maximum transfer of electrical power between the detector-transducer and the indicator. With respect to voltage sensitive, high resistance indicators, the detector-transducer has in comparison to the resistance of the indicator a low resistance which results in the optimum performance of such indicators. Thus, the selection of the level of resistance in the detector-transducer to match a current sensitive, low resistance indicator allows installation of the modified engine in an aircraft having either a high or low resistance indicator means with a single modification of the thermocouple wiring of the engine.

The supplementary thermocouple 30 provides a biasing electromotive force in the detector-transducer 26 and does not require additional connections for transmitting power from the aircraft to the detector-transducer. After modifying the engine, the temperature readings are adjusted solely by making small changes to the wiring within the engine avoiding the need to affect the wiring in the aircraft. Moreover, experience has shown that individually distinct resistors need not be used for the first and second resistances in the detector-transducer. The gauge and length of the thermocouple wire is tailored to provide the correct resistances between junctions which eliminates connections between the thermocouple wire and individual resistors. Such a system performs very well in the high temperature, severe vibrational environment of the gas turbine engine and avoids the need for delicate electrical instrumentation in such an environment.

Although the invention has been shown and described with respect to detailed embodiments thereof, it should be understood by those skilled in the art that various changes in form and detail thereof may be made without departing from the spirit and the scope of the claimed invention.

What is claimed is:

1. A detector-transducer for sensing a temperature in an engine having locations at different temperatures and working medium fluids flowing therethrough, which comprises:

a means for detecting temperature and transducing the temperature into a first electromotive force;

a resistor in series with the means for detecting and transducing temperature;

a supplementary thermocouple having a first junction and a second junction in series which are connected across the resistor;

wherein the first junction is placed in heat transfer communication with working medium fluids flowed through the engine at a first temperature and the second junction is placed in heat transfer communication with fluids flowed through the engine at a second temperature that is not equal to the first temperature to develop a second electromotive force which is adapted to bias the first electromotive force under operative conditions.

2. The detector-transducer of claim 1 wherein the supplementary thermocouple is a first thermocouple, and wherein the means for detecting and transducing temperature is a junction of a second thermocouple.

3. The detector-transducer of claim 2 which further includes a resistor in series with the supplementary thermocouple which is a first resistor, wherein the resistor in series with the junction of the second thermocouple is a second resistor, and wherein the first resistor and the supplementary thermocouple are connected in parallel across the second resistor.

4. The detector-transducer of claim 2 or 3 wherein the first junction of the supplementary thermocouple is disposed in close proximity to the junction of the second thermocouple such that said first junction and said junction of the second thermocouple are in heat transfer communication with working medium fluids at the same location and the temperature of the first junction and the junction of the second thermocouple are at substantially the same temperature to cause the biasing electromotive force to be proportional to the electromotive force generated by the second thermocouple under operative conditions.

5. The detector-transducer of claim 4 wherein the first junction of the supplementary thermocouple is between the first resistor and the second resistor and the second junction of the supplementary thermocouple is between the first junction and the second resistor.

6. The detector-transducer of claim 4 wherein the second junction of the supplementary thermocouple is between the first resistor and the second resistor and the first junction of the supplementary thermocouple is between the second junction and the second resistor.

7. The detector-transducer of claim 3 wherein the first resistor has a resistance which is at least ten times greater than the resistance of the second resistor and wherein the difference in temperature between the first junction and the second junction is greater than ten times the deviation under operative conditions of the temperature at the second junction from the average temperature of the second junction under operative conditions.

8. A temperature sensing system for sensing a temperature in a gas turbine engine, which comprises:

a detector-transducer having
  a means for detecting temperature and transducing the temperature into a first electromotive force,
  a resistor in series with the detector-transducer means, and
  a supplementary thermocouple having a first junction and a second junction in series which are connected in parallel across the resistor; and, an indicator means for indicating electromotive force having a resistance in series with the means for detecting and transducing temperature;

wherein the first junction of the supplementary thermocouple is placed in heat transfer communication with gases flowed through the engine at a first temperature and the second junction is placed in heat transfer communication with gases flowed through the engine at a second temperature that is not equal to the first temperature to develop a second electromotive force which biases the first electromotive force.

9. The temperature sensing systems of claim 8 which further includes a detector-transducer having a resistor in series with the supplementary thermocouple which is a first resistor, wherein the means for detecting and transducing temperature is a junction of a second thermocouple and wherein the resistor in series with the means for detecting and transducing temperature is a second resistor having a resistance which is one-tenth (0.1) of the resistance of the first resistor.

10. The temperature sensing system of claim 9 wherein the detector-transducer has an output impedance which is substantially equal to the input impedance of the indicator means.

11. The temperature sensing system of claim 9 wherein the input impedance of the indicator means is substantially greater than the output impedance of the detector-transducer.

* * * * *